United States Patent [19]

Heath

[11] 3,827,530

[45] Aug. 6, 1974

[54] VIBRATION-DAMPING SYSTEM
[76] Inventor: Arthur R. Heath, 6200 Afton, Dayton, Ohio 45415
[22] Filed: July 2, 1973
[21] Appl. No.: 375,728

[52] U.S. Cl............ 181/33 A, 180/68 R, 181/33 K, 188/1 B
[51] Int. Cl............................................. E04b 1/84
[58] Field of Search............ 180/68 R, 68 P, 69 R; 188/1 B; 165/69; 98/121 A, 121 R; 181/33 R, 33 K, 33 A, 33 M; 16/86 R, 86 A, DIG. 6

[56] References Cited
UNITED STATES PATENTS

| | | | |
|---|---|---|---|
| 650,290 | 5/1900 | Wirt | 181/33 A UX |
| 2,424,004 | 7/1947 | Terrell | 181/33 R |
| 2,641,024 | 6/1953 | Panagrossi | 181/33 A UX |
| 2,889,011 | 6/1959 | Weaver | 181/33 R X |
| 2,961,692 | 11/1960 | Engesser | 181/33 A UX |
| 3,193,049 | 7/1965 | Wollek | 181/33 A UX |
| 3,402,560 | 9/1968 | Alm | 181/33 A UX |

FOREIGN PATENTS OR APPLICATIONS 1,085,952  10/1967  Great Britain.................... 180/68 R Primary Examiner—Richard B. Wilkinson
Assistant Examiner—John F. Gonzales

[57] ABSTRACT

This disclosure is directed to a system for reducing significantly or eliminating radiator grill vibration noise in recreational vehicles occurring at comparatively high speeds. The vibration damping system provided is comprised of a combination of loner foam rubber or plastic strips located behind the horizontal grill members yet in contact therewith and a plurality of strut-strip members fastened to the outer face of said horizontal grill members wherein resilient foam rubber or plastic strip members are located between comparatively rigid strut members and the horizontal grill members.

10 Claims, 8 Drawing Figures

PATENTED AUG 6 1974 3,827,530

VIBRATION-DAMPING SYSTEM

This invention is directed to a composite system for reducing and even eliminating vibration noise occurring on the radiator or other grills of recreational and other vehicles, e.g., motorized campers, etc.

The problem presented when driving such recreational vehicles as Winnebago campers at reasonably high speeds, e.g., 50 to 70 m.p.h. is that the front grill of such vehicles frequently produces disturbing noise which reduces the enjoyment of passengers traveling therein and especially if the passengers desire to listen to a radio, stereo tapes, etc., while traveling. The noise generated is sufficiently disturbing to require reduction or elimination thereof to achieve the full enjoyment afforded by modern conveniences and entertainment systems frequently utilized in these vehicles especially over extended trips.

Accordingly, it is one purpose of this invention to reduce or, as near as practically possible, eliminate this troublesome and disturbing vibration noise or internal sound pollution. Another object of the invention is to reduce the noise level by utilizing a system which is not only economical and easy to install, but need not be replaced frequently.

The solution afforded by this invention is basically the provision of a plurality, usually at least three combinations of comparatively rigid struts in conjunction with yielding or resilient foam rubber or plastic strip members and fasteners on the given portion(s) of said grill, usually in a central portion(s) thereof. These combined strut-strip members can be used in conjunction with identical or similar "loner" yielding foam rubber strips, viz., foam rubber or plastic strips without metallic struts secured thereto. Said loner strip(s) are usually positioned remote from the strut-strip combination members and on the inside surface of the grill horizontal members whereas the foam strips in the strut-strip combinations are usually placed on the outside surface thereof. It is also within the purview of this invention, and usually on grills having shorter spans, to utilize only the strut-strip combination members, each of which are secured to horizontal grill members by one or more fasteners.

The invention will be described in greater detail in connection with the accompanying drawings:

FIG. 1 of the drawings is a perspective view of the front end of a recreational vehicle.

Figure 1:
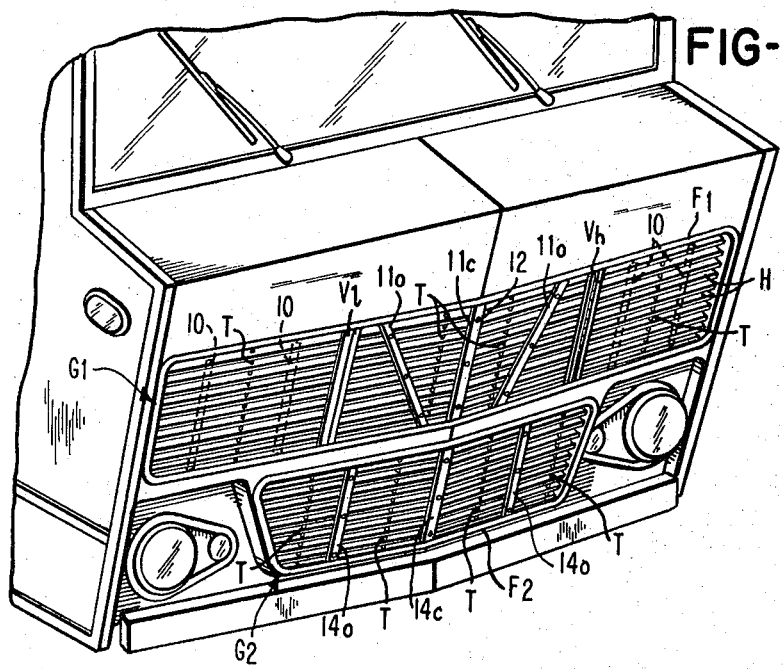
Figure 3:
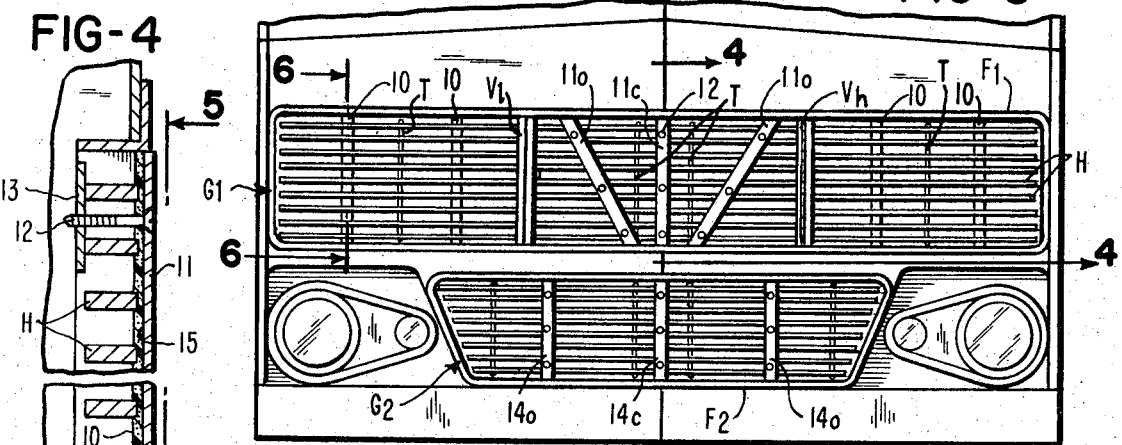
FIG. 3 is a fragmented front view of the same recreational vehicle as shown in FIG. 1 but more restricted to the upper and lower radiator grills.

As shown in FIGS. 1 and 3, upper and lower radiator grill portions, $G_1$ and $G_2$, respectively, are present in the front end of a recreational vehicle. Each radiator grill has its respective peripheral frame, $F_1$ and $F_2$. Both the upper and lower radiator grills have grill horizontal members H and the upper radiator grill $G_1$ additionally has vertical grill members V. Upper grill $G_1$ has three portions, a middle hinged portion, $V_h$, jointed to one outer portion $V_1$ (shown at the left in FIG. 1 and 3) by a latch (not shown) and a third outer portion shown at the extreme right of FIGS. 1 and 3. The hinging of this central grill portion permits access to the radiator for servicing from the front of the vehicle by unlatching said central portion and moving it from left to right.

Figure 4:
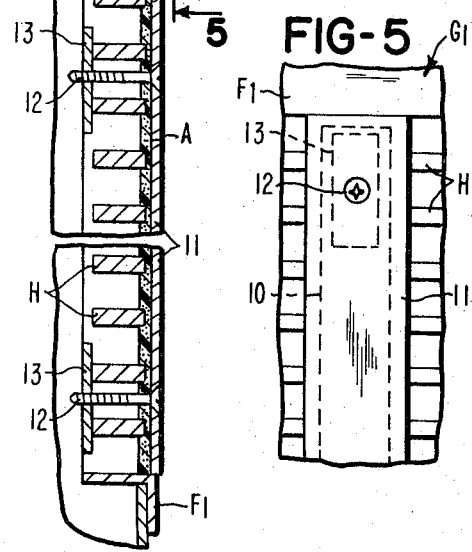
FIG. 4 is a fragmented view of section taken along the line 4—4 of FIG. 3 and showing an arrangement for securing the combined strut-strip member with the fastener devices.
Figure 8:
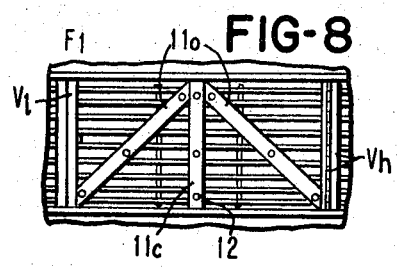
FIG. 8 is a fragmented front view of a portion of the upper radiator grill but showing an alternate arrangement for positioning of the strut-strip members to reduce vibration noise.

Each portion of the upper radiator grill $G_1$ and lower radiator grill $G_2$ has a plurality of hollow alignment tubes T to assist in the positioning and spacing of the horizontal grill members H. These alignment tubes T are conventional on this type of grill and apparently contribute to the vibration noise problem. The tubes T are shown in FIG. 1, 3 and 8, but they have not been illustrated in FIGS. 4 and 6 in the interest of clarity concerning this invention.

Figure 2:
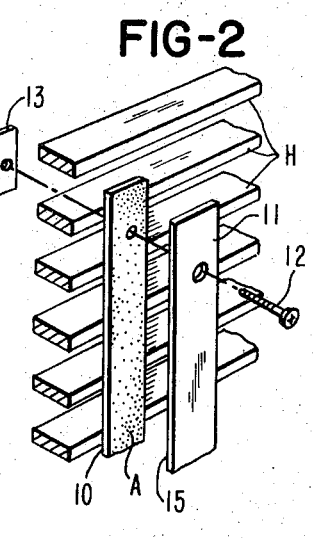
FIG. 2 is an exploded view of a portion of the front end having the aforementioned combination of metallic strut secured to foam rubber strip by fastener device to be assembled for positioning on the horizontal members of a radiator grill.

In accordance with this invention there is provided in the central portion of the upper radiator grill $G_1$ a plurality of metallic strut members 11 secured in position along the horizontal grill members H in association with an identical number of foam rubber strips 10 by fasteners 13 through the medium of screws, such as self-tapping screws shown at 12. The manner of securing these is illustrated in FIG. 2 wherein the fasteners 13 are placed behind horizontal members H of the grill and then the foam rubber strip sections 10, each of which preferably, although not necessarily, has an adhesive-coated face A applied thereto facilitating the maintenance of close contact between the foam rubber strip and the metallic strut member. Thus, the adhesive face A of these foam rubber strips directly contacts the grill-facing surface of each of the metallic struts which are utilized in conjunction with said foam rubber strips. The self-tapping screws 12 are then inserted through the strut-strip passing through the openings between the horizontal grill members into contact with fasteners. Upon tightening the screws, the strut-strip structures are held firmly in place to assist in vibration damping at high speeds.

Figures 5, 6, 7:
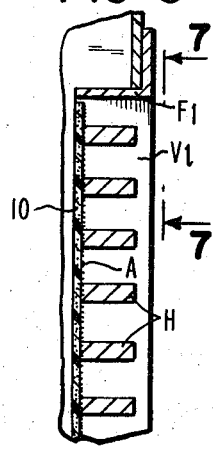
FIG. 5 is a frontal view of a portion of the vibration-damping system utilizing the strut-strip combination taken along the line 5—5 of FIG. 4.
FIG. 6 is a sectional view taken along the line 6—6 of FIG. 3 but showing the utilization of the loner resilient foam rubber or plastic member, positioned remote from the strut-strip combination members yet in place behind the horizontal grill members.
FIG. 7 is a sectional view along the line 7—7 of FIG. 6 showing the frontal arrangement of an upper portion of a foam rubber member positioned behind the grill to assist in vibration damping.

It will be noted from the drawings, especially FIGS. 1 and 3, that when the combination of metallic struts and foam rubber strips are employed in facial contact with one another that the foam rubber strip is positioned on the outside face of the grill whereas when the loner foam rubber strips are employed, these loner strips are placed interiorally of the grill. Preferably these loner foam rubber strips also have adhesive applied to the outward face thereof and the adhesive face is in contact with the inner horizontal grill portions H as shown, for example, in FIG. 6 and FIG. 7. The inwardly facing surface of the loner strips can abut the radiator as indicated in FIG. 6.

The positional (angular) arrangement of the strut-strip assemblies 14 on the lower radiator grill portion $G_2$ differs from that utilized for the upper strut-strip combinations shown at 11 in the middle portion of the upper grill $G_1$ in the positioning of the outer strut-strip members 11o versus 14o. The central strut-strip members 11c and 14c are positioned at the same angle. Regardless of angular positioning, all strut-strip members are assembled in the same manner as shown in the exploded detail afforded by FIG. 2.

A plurality of screw-fastener or other equivalent fastener devices are used in order to span the vertical distance along the strut-strip members 11 and 14 between the horizontal grill members as will be observed from FIGS. 1 to 4 and FIG. 8 in order to assure close contact between these composite damping members and the grill.

The angular positioning of the strut-strip members will depend to some extent upon the horizontal span of the horizontal grill members H and the geometry of the grill section to be damped. The longest horizontal span of the particular grill shown in the drawings is at $G_2$ and a substantially vertical placement of the strut-strip members has been found to work very well. Of course, while the number of strut-strip combinations and loner strips utilized and the configuration in which they are employed will vary somewhat depending upon the horizontal spans and specific grill geometry existing in such grill assemblies, the positional arrangements shown in FIGS. 1 and 3 on the one hand, and FIG. 8 on the other hand, have both been found to be very effective in reducing the noise level. As between the angular configurations in the shorter horizontal spans of the grills, viz., the upper grill portions $G_1$ of FIGS. 1 and 3 and FIG. 8, the configurational arrangement shown in FIGS. 1 and 3 has been found to be more effective in damping under operating speed and wind conditions producing a higher noise level.

Thus, while the basic closely positioned or even structurally touching, viz., contiguous, inverted V configuration of FIG. 8 has effected a significant reduction in vibration noise level inside the camper, the more openly spaced and non-contiguous V configuration shown in FIGS. 1 and 3 has virtually eliminated vibration noise observable in the interior of the recreation vehicle. This is somewhat surprising inasmuch as one might expect the closer spacing of the strut-strip combination members to provide a tighter damping effect. Both the closely spaced or even contiguous inverted V configuration of FIG. 8 and the non-contiguous or more widely apart spaced V configurations of FIG. 1, respectively, were utilized on the same middle portion of the same upper radiator grill portion $G_1$ in the same recreational vehicle, viz., the 1972 "Chieftain" "Winnebago" camper.

It is also within the purview of this invention to utilize loner foam rubber or plastic strips positioned between any of the strut-strip members 14o or 14c, or 11o or 11c of the upper central or lower grill members. In such cases, the loner strips are located on the interior of the grill in contact with the horizontal grill portions H and between the grill and the radiator or the front wall of the recreational vehicle. These loner strips, when so utilized, can be positioned vertically or angularly with repect to the horizontal grill members H.

According to a preferred embodiment of this invention, foam rubber stripping, e.g., of the type employed as weather stripping, is employed for the resilient strips 10 regardless of whether they are utilized as loner strips behind the horizontal members of the grill or in conjunction with the struts on the outer grill face. A convenient and practical thickness for these resilient foam strips has been found to be from about 0.125 to about 0.375 inch, e.g., about 0.25 inch, where the horizontal grill members have a thickness of about 0.125 to about 0.25 inch, e.g., about 0.1875 inch, and a width of about 0.5 to about 1.0 inches, e.g., 0.75 inch. Typically, the horizontal grill members have a total horizontal (length) span of about 20 inches to about 48 inches between vertical portions of the peripheral frame. The horizontal grill members of the middle hinged portion of upper grill $G_1$ usually have a span of from about 25 inches to about 30 inches between vertical grill members compared with the horizontal span of about 20 inches to about 25 inches for the outer portions of $G_1$. The span of the horizontal grill members H of the lower grill $G_2$ usually ranges from about 36 inches to about 48 inches.

According to a preferred embodiment of this invention, the foam strips 10 have an adhesive material, which can be a pressure-sensitive adhesive, is applied to one surface or face A thereof. Also, it has been found desirable to utilize strips having a width less than the width of the strut where the resilient foam strip is used in facing contact with the struts, viz., in the strut-strip members. The loner strips 10 are usually of the same width and thickness as the strips 10 which are in facial contact with the struts in the strut-strip members. However, the loner strips can be thicker or thinner or wider or narrower than the strips of the strut-strip members. Clearly, the length of the loner strips will be sufficient to contact all of the horizontal grill members.

Usually the metallic struts are from about 0.0625 to about 0.25 inch in thickness, e.g., about 0.125 to 0.1875 inch thick. They are sufficiently long to span the vertical extent of the horizontal grill members H. It will be observed that in both the configurations shown in FIGS. 1 and 8, the central strut-strip members 11c are positioned in a generally vertical relationship compared with the horizontal grill members whereas the outer strut-strip combined members 11o are positioned angularly with respect to both said central member 11c and the horizontal grill members. In the longer overall horizontal spans where vibration damping is to be obtained in accordance with this invention, such as in the lower radiator grill $G_2$, all of the strut-strip combinations 14 can be positioned in a generally vertical manner.

According to a preferred embodiment of this invention, the metallic struts are of extruded aluminum alloys, e.g., those having the following basic overall properties (prior to extrusion): Tensile Strength, 32,000 pounds per square inch; Yield Strength (offset = 0.2 percent) of 28,000 pounds per square inch; Elongation (percent in 2 inches) of 16 percent for Sheet Specimen of one-sixteenth inch thickness and 22 percent for Round Specimen of one-half inch diameter and Brinell Hardness, 500 kilogram load, 10 millimeter Ball of 60. One exemplary extruded aluminum alloy is available commercially from the Central Steel and Wire Company under the alloy and temper designation "6063-

T5". These struts are easily extruded and machined to the desired shape and configuration.

These aluminum struts can be either rectangular in cross section or have the outer and/or inner faces in a curved or beveled configuration, viz., the outer face first confronting the wind as the vehicle is being driven or the inner face which is in contact with the foam rubber strip at its adhesive face. Similarly, the outer face can be flat and the inner face can be curved or beveled or the outer face can be curved or beveled and the inner face can be flat. Alternatively, the same observation is true in respect of the foam rubber strips which can have flat or curved surfaces, respectively, in contact with the outer portions of the horizontal grill members H and/or the inwardly facing surfaces 15 (see FIGS. 2 and 4) of the struts. It is also within the purview of this invention to apply adhesive coatings to both the major surfaces of the foam rubber strips 10 to aid in positioning them securely.

The foam rubber strips can be made from a wide variety of available foam materials, and the composition need not be limited to natural or synthetic rubbers. Clearly, foam plastic materials can be employed. Similarly the metallic struts need not be made of aluminum or aluminum-containing alloys but instead can be made of ferrous or other non-ferrous metals, or alloys, e.g., steel, magnesium, magnesium-steel alloys, brass, copper, etc., or alloys containing these metals. Moreover, plastic struts, e.g., high impact polystyrene, polypropylene, polyethylene, polyurethane, etc., can be employed. Plastic struts have the further advantage of being weather resistant, and resistant to discoloration. In general, any material can be used for the struts so long as it possesses sufficient rigidity in reasonable thickness to effect the desired vibration damping.

The vibration-damping system set forth in respect of this invention can be installed readily in the radiator grill assemblies of subject recreation vehicles either at the factory where they are produced or by the owners thereof in a "do-it-yourself" manner.

When installing the vibration-damping system on reasonably long horizontal spans of grill, such as present in upper radiator grill G₁, the loner strips 10 are positioned with their adhesive faces A in contact with the inner width of the horizontal grill members 10. Once these members are in place, the strut-strip portions are installed by temporarily positioning the fasteners 13, preferably (but not necessarily) of the same material as utilized to form the struts 11, behind the horizontal grill members while the strut-strip combinations 11-10 are positioned so that the openings in the struts can be utilized with the screws or other fastening devices 12 to effect the positioning of the inner face of the foam rubber strip in intimate contact with the outer comparatively thin dimension of the horizontal grill members H. Of course, the adhesive-faced surface A of the foam rubber strips will be in close mating relationship with the inwardly facing surface 15 of the strut members 11. This is noted in FIG. 2.

Thus it will be observed that the present invention provides a readily installed, vibration-damping system for campers which need not be replaced frequently and can afford an economical, practical and efficient solution to the vibration noise problem existing due to grill noise.

A wide variety of pressure-sensitive adhesives can be employed in accordance with the present invention for the resilient strips. The adhesive is preferably one which is capable of maintaining its sticky or adhesive nature over a reasonably extended period of time at both high and low ambient outdoor temperatures. For example, pressure-sensitive copolymeric adhesives of the type mentioned in Caldwell et al, U.S. Pat. No. 3,160,549 can be utilized in accordance with this invention.

PRIOR ART

It will be observed that in the Caldwell et al. U.S. Pat. No. 3,160,549, vibration damping structures, comparatively thin, non-rigid aluminum foil layers are employed in connection with rubbery foam layers in attempts to effect vibration damping on structures such as aircraft. Such Caldwell et al structures are considerably different in their approach to vibration damping than the present invention which utilizes comparatively rigid metallic struts in connection with foam rubber layers which are secured through fasteners in intimate physical and permanent contact with the outer face of horizontal grill members to solve a specific problem occurring in recreational vehicle grill assemblies.

Wollek, U.S. Pat. No. 3,193,049, illustrates a sound damping tape structure incorporating an aluminum foil layer and crepe paper.

The present inventor has found that, in general, tape structures, while they afford a temporary and partial solution to the vibration-noise problem, in no way constitute as fully efficient solution to the problem as obtainable in accordance with the use of the sound vibration damping systems of this invention. Clearly, the very different problems in vibration sound presented by induced recreational vehicle grill assemblies traveling at moderately high speeds do not respond well to the sound damping tapes.

Another prior art sound-damping tape is mentioned in U.S. Pat. No. 3,386,527 to Daubert et al. This laminated foam or crepe paper tape utilizes sound dissipative adhesive material laminated on crepe paper or foam to dampen sound on vibrating sheet metal panels. Adhesive spacers (strips) are used to secure the conversion material to the panel. The paper or foam conversion material is disclosed as being capable of converting mechanical (vibratory) energy to frictional (heat) energy. These panels present a comparatively continuous surface which is not presented in the horizontally oriented grill members of grill portions G₁ and G₂ to which the present invention constitutes an effective and economical solution.

U.S. Pat. No. 3,511,741 to Elder teaches use of an adhesive layer containing an embedded woven metal glass or plastic member to dampen sound in metal-to-metal laminates. The woven layer is said to be "stress" raising.

None of these prior art sound damping structures reveal the present invention or are directed to the particular problems caused by vibrating grill members.

What is claimed is:

1. A vibration noise damping system for vehicle grills comprising:
   a vehicle grill having horizontal members,
   a plurality of resilient foam strips the vehicle facing surface of which is positioned on and in contact with the exterior face of horizontal grill members, a plurality of comparatively rigid strut members secured to said strips, the vehicle-facing surface of said struts being in contact with and secured to the outwardly facing surface of said strips to form strut-strip members and securing means a portion of which is located behind the horizontal grill members on the vehicle-facing surface thereof to secure and maintain said strut-strip members in intimate contact with said horizontal grill members.

2. A vibration noise damping system as in claim 1 which includes at least one loner resilient foam strip positioned behind the horizontal grill members and in contact with the vehicle-facing surface thereof.

3. A vibration noise damping system as in claim 2 wherein said strut-strip members are located in the central region of said vehicle grill and a plurality of said loner strips are located on the outer regions thereof at least one loner strip on each outer region.

4. A vibration noise damping system as in claim 1 wherein at least three of said strut-strip members are positioned in the central region of said grill, the central strut-strip member being positioned in said central region in a vertical relation to said horizontal grill members and the outer strut-strip members being positioned in said central region in an angular V-shaped manner in relation to said horizontal grill members and spaced from said central strut-strip member.

5. A vibration noise damping system as in claim 1 wherein at least three of said strut-strip members are positioned in the central region of said grill, the central strut-strip in being positioned in said central region i a vertical relation to said horizontal grill members and the outer strut-strip members being positioned in said central region in an inverted V-shaped manner with the upper portions of said outer strut-strip members being in contact with said vertically positioned strut-strip member.

6. A vibration noise damping system as in claim 1 wherein said securing means for each strut-strip member comprises at least one screw positioned from the outer face of said strut inwardly to join a fastener element located on the vehicle facing surface of said horizontal grill whereby tightening of said screw increases the extent of contact between said strut-strip members and said horizontal grill members.

7. A vibration noise damping system as in claim 3 wherein a plurality of said loner strips are located in each outer region of said grill.

8. A vibration noise damping system as in claim 1 wherein each resilient strip has an adhesive material on at least one major surface thereof.

9. A vibration noise damping system as in claim 8 wherein said adhesive material is located on the major surface of each said strip in contact with a strut.

10. A vibration noise damping system as in claim 2 wherein each said loner strip has an adhesive material on its outwardly facing major surface.

* * * * *